No. 610,714. Patented Sept. 13, 1898.
A. M. LARUE.
CAR COUPLING.
(Application filed May 4, 1898.)
(No Model.)
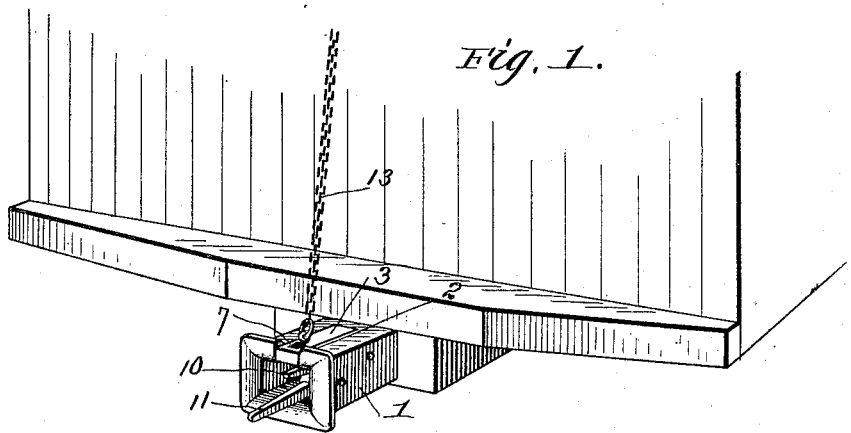
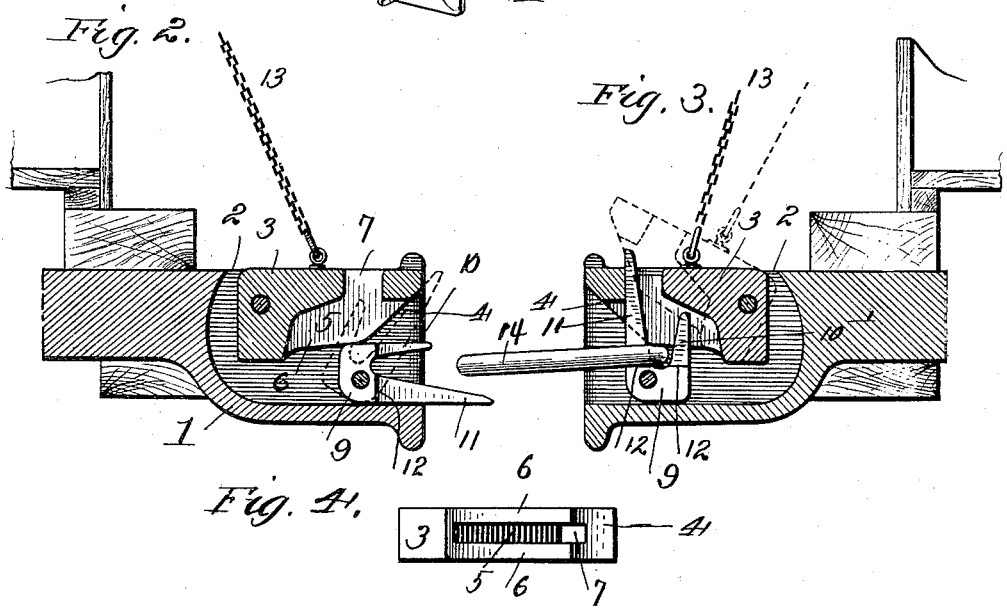
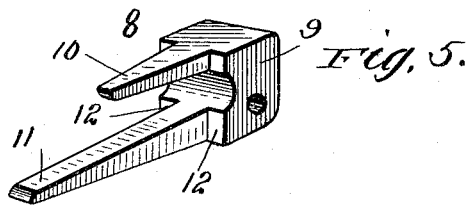
Witnesses
G. M. Lamasure
G. H. Walmsley
Inventor
A. M. Larue
By Davis & Davis
Attorneys

UNITED STATES PATENT OFFICE.

ALVY M. LARUE, OF DOWNEY, IOWA.

CAR-COUPLING.

SPECIFICATION forming part of Letters Patent No. 610,714, dated September 13, 1898.

Application filed May 4, 1898. Serial No. 679,704. (No model.)

*To all whom it may concern:*

Be it known that I, ALVY M. LARUE, a citizen of the United States, residing at Downey, in the county of Cedar and State of Iowa, have invented certain new and useful Improvements in Car-Couplers, of which the following is a specification, reference being had therein to the accompanying drawings, in which—

Figure 1 is a perspective of a coupler in position. Fig. 2 is a longitudinal vertical sectional view showing the parts in position to receive the link. Fig. 3 is a similar view showing the link in position. Fig. 4 is a detail bottom view of the pivoted detent. Fig. 5 is a detail perspective of the locking-dog.

The object of the invention is to provide a simple automatic coupler in which an ordinary link will be employed, the parts being so constructed that they will hold the link in position for insertion into an adjoining draw-head.

The invention consists in the novel combination and arrangement of parts hereinafter set forth, and particularly pointed out in the claims appended.

Referring to the various parts by numerals, 1 designates a draw-head formed with a central opening 2 in its upper side. Within this opening is a heavy detent 3, which is pivoted near its rear end on a horizontal pivot, its forward face being beveled inwardly and downwardly, as at 4. Extending rearwardly from said beveled face is a central longitudinal recess 5, which forms two side walls 6, and communicating with this recess is a vertical arm receiving and retaining recess or opening 7.

Forward of the pivot of the detent and below the detent is pivoted a locking-dog 8. The head 9 of this dog is substantially rectangular and is mounted eccentrically on its pivot in its normal position, the greater portion being above its pivot, as shown in Fig. 2. Projecting forward from the head of the dog is an upper short arm 10 and a lower long link-retaining arm 11. The lower side of the long arm is flat and rests when in position to receive the link on the bottom of the draw-head opening. The upper side of this arm is inclined upward from its forward end rearward to a point above the center of the pivot, preferably to a point above the pivot, as shown in Fig. 2. The upper short arm 10 extends forward a suitable distance, and both these arms are narrower than the head of the dog, so that shoulders 12 are formed thereon at each side of said arms. When the parts are in position to receive the link 14, as shown in Fig. 2, the detent 3 rests on the upper surface of the dog 8 and the lower side of the dog-head, and the arm 11 rests on the bottom of the draw-head opening.

In operation the ingoing link 14 rides up the inclined surface of the arm 11 and contacts with the head of the dog above its pivot, the link being then between the two arms. A continued movement of the link turns the dog rearwardly on its pivot, the short arm 10 passing up between the walls 6 6 of the detent and receiving the thrust of the link. The long arm of the dog will pass up within the link, and the inclined side thereof will contact with the beveled face 4 of the detent and raise said detent until the end of said arm passes into the recess 5 and up through the hole 7. The detent will then drop into its normal position. The inner end of the link rests on the shoulders 12, and the sides 6 of the detent bear on the link on each side of the dog and maintain the link in a horizontal position, as shown in Fig. 3. When the parts are in this position, the flat side of the long arm bears against the front wall of the opening 7 and receives the strain put on the link. When it is desired to uncouple the cars, the detent 3 is raised by a chain 13 or by any other means until it releases the arm 11. When uncoupled, the parts automatically assume the position which enables them to be automatically coupled, (shown in Fig. 2,) and the link is always in position to enter an adjoining draw-head.

It will thus be seen that a very simple automatic coupler is provided, in the construction of which the ordinary link may be employed and with a slight alteration a draw-head of the usual construction. The parts are simple and are of strong solid construction.

The inward and downward inclined front of the detent 3 forms practically a part of the upper front wall of the draw-head. The lower edges of its side walls 6 rest upon the head of the locking-dog 9 when the parts are in their uncoupled position and positively hold the said dog in the proper position to receive the link from an approaching coupler. When the parts are in their coupled position, the arms 10 and 11 of the detent extend up between the walls 6 of the detent, and the lower edges of these walls bear on the link and clamp or hold it upon the shoulders 12 of the locking-dog and maintain it in position to enter an approaching drawhead. It will thus be seen that the detent serves the double purpose of holding the locking-dog steadily in position to receive the link and of holding the said link in position for entering an approaching draw-head. In this manner the use of springs in connection with either the detent or the locking-dog is avoided and positive action of these parts is secured.

Having thus fully described my invention, what I claim, and desire to secure by Letters Patent, is—

1. In an automatic car-coupling, the combination of a draw-head, a locking-dog pivoted therein upon a horizontal pivot and provided with lateral link-supporting shoulders, which when in a coupled position lie above the pivot, said dog being provided with two arms projecting forward from the pivot, the shorter arm being above the pivot of the dog and far enough from the lower longer arm to receive the link between them; and a detent in the draw-head and pivoted upon a horizontal pivot back of and above the dog, said detent being provided with a recess extending rearward from its front edge and adapted to receive the arms of the dog when the same is turned over, said recess forming depending side walls which normally rest upon and hold the dog in its uncoupled position and upon the inner end of the link and embrace and lock the two arms of the dog in a coupled position, substantially as and for the purposes set forth.

2. The combination of a draw-head, a tumbling dog pivoted in the forward end thereof near its mouth and provided with a pair of arms between which the incoming link strikes, means adapted to lie under the link when coupled and support it, and a locking-detent pivoted above the dog and normally resting upon and holding the same in position to receive the link, said detent being provided with a recess to receive and embrace and lock the arms of the dog when coupled, said recess forming walls which bear upon the inner end of the link and hold it in the crotch formed by the arms and upon the supporting means, whereby said detent performs the triple function of normally holding the coupling-dog in position when uncoupled and locking it when coupled and supporting the link in position to enter an approaching drawhead.

In testimony whereof I hereunto affix my signature, in the presence of two witnesses, this 22d day of April, 1898.

ALVY M. LARUE.

Witnesses:
C. H. WICKERSHAM,
WM. BREMNER.